United States Patent

Dobler et al.

[11] Patent Number: 5,175,497
[45] Date of Patent: Dec. 29, 1992

[54] MEASURING DEVICE FOR DETERMINATION OF ROTARY ANGLE

[75] Inventors: Klaus Dobler, Gerlingen; Hansjörg Hachtel, Weissach, both of Fed. Rep. of Germany

[73] Assignee: Robert Bosch GmbH, Stuttgart, Fed. Rep. of Germany

[21] Appl. No.: 606,055

[22] Filed: Oct. 29, 1990

[30] Foreign Application Priority Data

Jan. 20, 1990 [DE] Fed. Rep. of Germany ... 9000575[U]

[51] Int. Cl.$^5$ .......................... G01B 7/14; G01B 7/30; H01F 21/02; H01F 21/04
[52] U.S. Cl. .......................... 324/207.25; 324/207.22; 336/79
[58] Field of Search ...................... 324/207.11, 207.13, 324/207.15, 207.16, 207.17, 207.18, 207.19, 207.22, 207.25; 336/75, 77, 79, 134, 135, 200; 340/870.31, 870.32, 870.33, 870.34, 870.35

[56] References Cited

U.S. PATENT DOCUMENTS 3,961,243  6/1976  Schulz ........................... 324/207.19
4,464,645  8/1984  Norton ............................. 336/135

Primary Examiner—Walter E. Snow
Attorney, Agent, or Firm—Michael J. Striker

[57] ABSTRACT

A measuring device for contactless determination of a rotary angle has two movable members which are rotatable relative to one another and two sensor coils whose resistance value to alternating current is varied by relative changes of values of regions of the members associated with the coils. One of the bodies members has a region corresponding to a number of the coils. At least one of the coils formed as a wire coil is arranged on the region. At least one second of the members is arranged on both end sides of the first member.

12 Claims, 1 Drawing Sheet

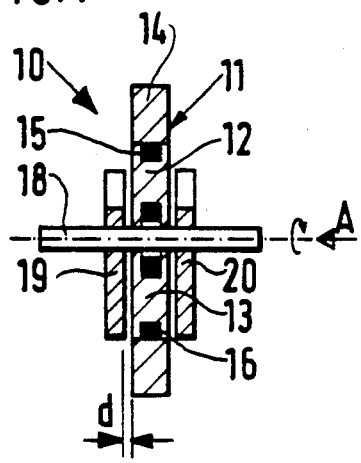
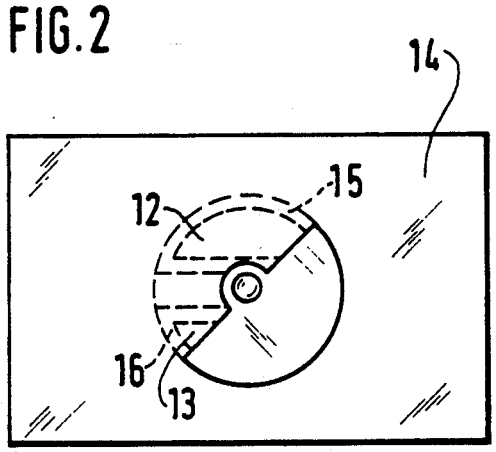
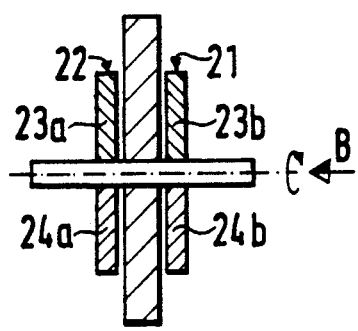
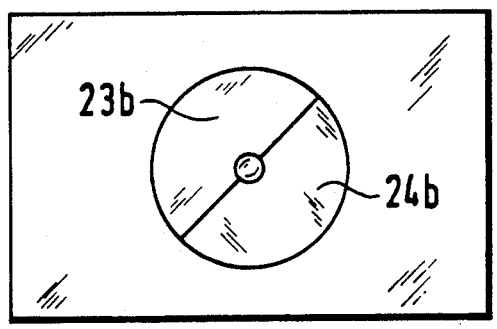
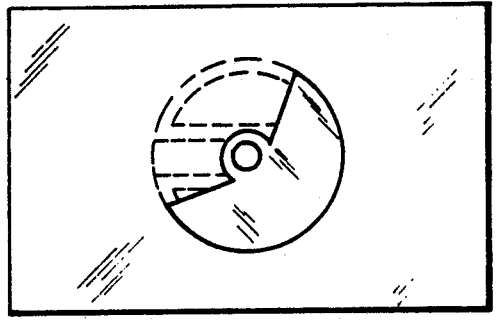

MEASURING DEVICE FOR DETERMINATION OF ROTARY ANGLE

BACKGROUND OF THE INVENTION

The present invention relates to a measuring device for determination of a rotary angle. More particularly, it relates to a measuring device for contactless determination of rotary angles by means of two members which are movable relative to one another and sensor coils whose resistance to alternating current is varied by relative change of the value of the regions associated with the coils and composed of electrically conductive and/or ferromagnetic material.

Measuring devices of the above mentioned general type are known in the art. One such measuring device is disclosed, for example in German document DE-OS 3,824,535.2 in which a central longitudinal groove is formed in a cylindrical coil member at its one end side. Therefore two semicircular cores are produced and a coil is wound on them. A measuring part which serves for damping is composed of an electrically conductive and/or ferromagnetic material. It surrounds at least partially the outwardly located coil regions in an axial length. An alternating current flows through the coils. By the relative rotation of the measuring part, the overlapping ratio between the measuring part and the coils is changed in an opposite direction, whereby the alternating current resistance of the coils varies correspondingly. This measuring device has the disadvantage that in the case of the movable coil core the coils cannot be wound by a winding machine one after the other. The winding technique and thereby the manufacture of the measuring device is very expensive.

Another measuring device for contactless measurement of a path and/or angle change is disclosed in German document DE-OS 3,824,534.5. In this device at least two coils are formed by an etching technique on a disc-shaped member. The etched coils can be used however only in a limited frequency region of the alternating current which flows through the coils.

SUMMARY OF THE INVENTION

Accordingly, it is an object of the present invention to provide a mearing device which avoids the disadvantages of the prior art.

More particularly, it is an object of the present invention to provide a measuring device in which coils can be produced in a simple technique.

In keeping with these objects and with others which will become apparent hereinafter, one feature of the present invention resides, briefly stated, in a measuring device in which the first member has regions corresponding to the number of the coils on which respectively wire coils are arranged, and at least one second member is arranged at each end side of the first member.

When the device is designed in accordance with the present invention, due to the axial offset of both coil members, both windings can be achieved by means of a single winding machine simultaneously. The wire-wound coils come in contact to the edged coils can operate in a simple manner in wider frequency region, for example between 5 kHz to 5 MHz. By changing the diameter of the coil wire and the number of windings of the coils, despite a small structural size of the coil members, the coil can be adjusted to the desired frequency. Especially when the wire coils have a high number of windings, the manufacture is simpler as opposed to multilayer etching etched or planted coils. The shape just simplifies the manufacture of the measuring device. Furthermore, both coils at both end sides and/or the peripheral sides can be covered with measuring parts of different material so that for measuring signal generation the opposite action of the so-called ferromagnetic effect and the eddy current effect can be used. The measuring error due to the construction is relatively low.

In accordance with another feature of the present invention, the one second member is arranged at each end side of the first member.

Still another feature of the present invention is that the second members arranged at the end side of the first member are approximately identical and located opposite to one another.

In accordance with a further feature of the present invention, the second members can be composed of a region from a ferromagnetic and electrically conductive or ferromagnetic material, and the region of a non-ferromagnetic but electrically conductive material.

Still a further feature of the present invention is that the above mentioned regions of the same material on the second members are located opposite to one another.

The first member in accordance with still another embodiment of the present invention, can have an approximately D-shaped cross-section.

Finally, the second members can be formed as discs and have an angular region equal to or greater than the coil.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a measuring device in accordance with the present invention;

FIG. 2 is a view of the inventive measuring device as seen in direction of the arrow A in FIG. 1;

FIG. 3 is a view showing a further modification of the inventive measuring device;

FIG. 4 is a view as seen in the direction of the arrow B in FIG. 3; and

FIG. 5 is a view showing a further modification of the inventive device.

DESCRIPTION OF THE PREFERRED EMBODIMENTS

FIG. 1 shows a sensor which is identified as a whole with reference numeral 10. It has a stationary coil body 11 which is preferably composed of an electrically non-conductive material. The coul body 11 includes two cores 12 and 13 which have an approximately D-like shape as seen in a cross-section and arranged on a support 14. It is however also possible to have cores of a different shape.

Coils 15 and 16 are arranged on the respective cores and wound in the peripheral direction of the coil body 11. The coils 15 and 16 are wire coils. In an especially simple manner the coils can be adjusted to a wide carrier frequency region of approximately 5 kHz to 5 MHz despite relatively small construction of the coil body 11.

For this purpose it is sufficient to change the diameter of the wire and the number of the windings. The higher is the number of windings with the same coil diameter, the lower can be selected the carrier frequency. With higher carrier frequencies only a small number of windings is needed.

Semi-circular disc bodies 19 and 20 are arranged at both sides of the coil body 11 and movable relative to the coil body. The disc bodies 19 and 20 are in registry with one another. They are mounted on a rod 18 arranged in an opening which is formed between cores 12 and 13. The disc body members 19 and 20 are composed of an electrically conductive and/or ferromagnetic material. Due to their approximately D-shaped construction in the cross-section the overlap in the initial position aproximately the half of the end surfaces of the coils 15 and 16. The disc members 19 and 20 are connected with a rotary shaft 18 whose rotary movement must be determined. It is however also possible to connect the shaft with a not shown structural element and therefore determine its rotary movement.

In an oriented so that both cores 12 and 13 at both end sides are overlapped with the same surfaces. The sensor 10 can operate in accordance with the inductive or eddy current principles. In the event of the eddy current principle and alternating current flows through the coils 15 and 16. The disc members 19 and 20 are rotated during measurement parallel to the end sides of the coil body 11. A magnetic alternating field is produced on the coils 15 and 16 and reduces eddy current on the metallic surface of the disc members 19 and 20. The greater is the surface of the disc bodies 19 and 20 through which the magnetic field extends, the higher is the eddy current. Further, the value of the produced eddy current depends on the utilized material of the disc members 19 and 20, and the distance of the coil 13 and 16 to the surface of the disc bodies 19 and 20.

Due to the produced eddy current, the alternating current resistance of the coils changes, and this is used for the recovery of a measuring signal. Since also the coil inductivity is reduced, this inductivity change can also be utilized for the recovery of the measuring system (coil inductivity evaluating process). During the rotary movement of the disc bodies 19 and 20, the values of the disc members 19 and 20 associated with the respective coils 15 and 16 change. Thereby the surface of the disc bodies 19 and 20 associated with the coil 15 increases by such an amount by which it is reduced for the other coil 16. The both coils 15 and 16 during the coil alternating current resistance evaluating process, are connected with one another in a Wheatstone semi-bridge circuit. Thereby measuring errors which occur simultaneously and in the same direction in the coils 15 and 16 are compensated.

As shown in FIG. 3 it is also possible to form the measuring discs on both end surfaces of the coil cosres 12 and 13 as circular discs 21 and 22. The circular discs are composed of approximately same-size segments. The segments 23a and 23b are composed of ferromagnetic but electrically conductive material, such as for example aluminum. The second segments 24a and 24b are composed of ferromagnetic material, such as for example automate steel. The discs 21 and 22 are approximately identical, so that the segments of the same materials are located opposite to one another.

when the alternating current again flows through the coils 15 and 16, the magnetic alternating fields of the coils 15 and 16 act on the surfaces of the segments 23a, 23b, 24a, 24b. With the segments 23a, 23b of not ferromagnetic and electrically conductive material, only eddy current effects take place. The thusly produced eddy currents reduce the magnetic alternating fields of the coils, so that the coil inductivity decreases. In contrast were the segments 23a, 23b of ferromagnetic material, a ferromagnetic effect takes place. This means that the magnetic properties of the material of the segments 24a and 24b act for reinforcing the coil magnetic field, so that the coil inductivity is increased. The both effects therefore act opposite to one another. As a result, a measuring signal amplification is produced.

In addition, due to the construction of the disc members 21 and 22, the error attributed to the axial offset of the measuring disc is reduced. Both measuring effects are dependent on the distance of the surfaces of the discs 21 and 22 to the coils 15 and 16. Since the distance of the disc 21 and 22 of the coils 15 and 16 during axial movement of the shaft 18 changes in opposite direction, the thusly produced measuring errors are compensated.

The increase of the measuring signal is based on the idea that during the radial rotation of both disc 21 and 22, the surface of one coil 15 engaged by the segments 23a and 23b for example is increased, while the engaged surface of the other segments 24a and 24b is reduced by the same value. Correspondingly the opposite situation occurs in the coil 16. When both coils 15 and 16 are connected in a Wheatstone bridge, a higher measuring signal is produced by adding of both different measuring effects than in the case when only the inductive effect or only the eddy current effect is used for measurements.

FIG. 5 shows a further modification of the embodiment shown in FIGS. 1 and 2. Here both disc members 19 and 20 are no longer formed as approximately D-shpaed discs. Instead, they overlap a surface more than 180°. It is especialy advantageous when the value of the surface is approximately 200°-220°. It is also here important that the disc members 19a and 20a at both end sides are approximately in register with one another and arranged in registry. Thereby, the approximately linear region of the calibrating curve can be increased.

It is to be understood that instead of two coils for example four or another greater number of coils can be used, whereby smaller measuring angles can be determined. For this purpose a corresponding number of cores offset in the radial direction can be utilized. With four cores, they have maximum segment size of 90°. A coil is wound on each core and the coils are connected in a Wheatstone bridge circuit. Further, the four cores on each end side, two discs having a segment region of approximately 90° are arranged. The discs must be formed for example so that in the initial position, each coil is overlapped only over its half. If both processes are desired to be worked with as in FIG. 3, this is also true in an analogous manner for such as variant as well.

It will be understood that each of the elements described above, or two or more together, may also find a useful application in other types of constructions differing from the types described above.

While the invention has been illustrated and described as embodied in a measuring device for contact-less determination of a rotary angle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A measuring device for contactless determination of a rotary angle, comprising two movable members which are rotatable relative to one another; coil means whose resistance value to alternating current is varied by relative changes of values of regions of said members associated with said coil means, one of said members having a region corresponding to said coil means, said coil means being formed as a wire coil being arranged on said region, at least one second of said members being arranged on both end sides of said first member, said second member having a region composed of a ferromagnetic material selected from the group consisting of a material which is ferromagnetic and electrically conductive and a material which is ferromagnetic, and another region composed of a material which is non-ferromagnetic and electrically conductive.

2. A measuring device as defined in claim 1, wherein one such second member is arranged at both end sides of said first member.

3. A measuring device as defined in claim 1, wherein said second members arranged at both end sides of said first member are approximately identical and arranged opposite to one another.

4. A measuring device as defined in claim 1, wherein said first member is composed of a material selected from an electrically conductive material and ferromagnetic material.

5. A measuring device as defined in claim 4, wherein the regions of said second members composed of same materials are located opposite to one another.

6. A measuring device as defined in claim 1, wherein said first body has an approximately D-shaped cross-section.

7. A measuring device as defined in claim 1, wherein said second members are formed as disc and extend over an angular region corresponding to said coil.

8. A measuring device of contactless determination of a rotary angle, comprising two movable members which are rotatable relative to one another; coil means including two symmetrical, oppositely located sensor coils whose resistance value to alternating current is varied by relative changes of values of regions of said members associated with said coils, one of said members having a region corresponding to a a number of said coils, at least one of said coils formed as a wire coil being arranged on said region, at least one second of said members being arranged on both end sides of said first member, said second member being formed as disc composed of a material selected from the group consisting of a material which is ferromagnetic and electrically conductive and a material which is ferromagnetic and extend over an angular region greater than said coil.

9. A measuring device as defined in claim 8, wherein one such second member is arranged at both end sides of said first member.

10. A measuring device as defined in claim 8, wherein said second members arranged at both end sides of said first member are approximately identical and arranged opposite to one another.

11. A measuring device for contactless determination of a rotary angle, comprising two movable members which are rotatable relative to one another; two coil means including symmetrical, oppositely located sensor coils whose resistance value to alternating current is varied by relative changes of values of regions of said members associated with said coils, one of said members having a region corresponding to a number of said coils, at least one of said coils formed as a wire coil being arranged on said region, at least one second of said members being arranged on both end sides of said first member, said second member being formed as disc composed of a material selected from the group consisting of a material which is ferromagnetic and electrically conductive and a material which is ferromagnetic and extend over an angular region greater than said coil, said second member having a region composed of a ferromagnetic material selected from the group consisting of a material which is ferromagnetic and electrically conductive, and a material which is ferromagnetic, and another region composed of a material which is non-ferromagnetic and electrically conductive.

12. A measuring device as defined in claim 11, wherein the regions of said second members composed of same materials are located opposite to one another.

* * * * *